(No Model.)
G. HANKE, G. W. COX & J. B. WILSON.
DROPPING AND MARKING ATTACHMENT FOR CORN PLANTERS.
No. 560,581. Patented May 19, 1896.
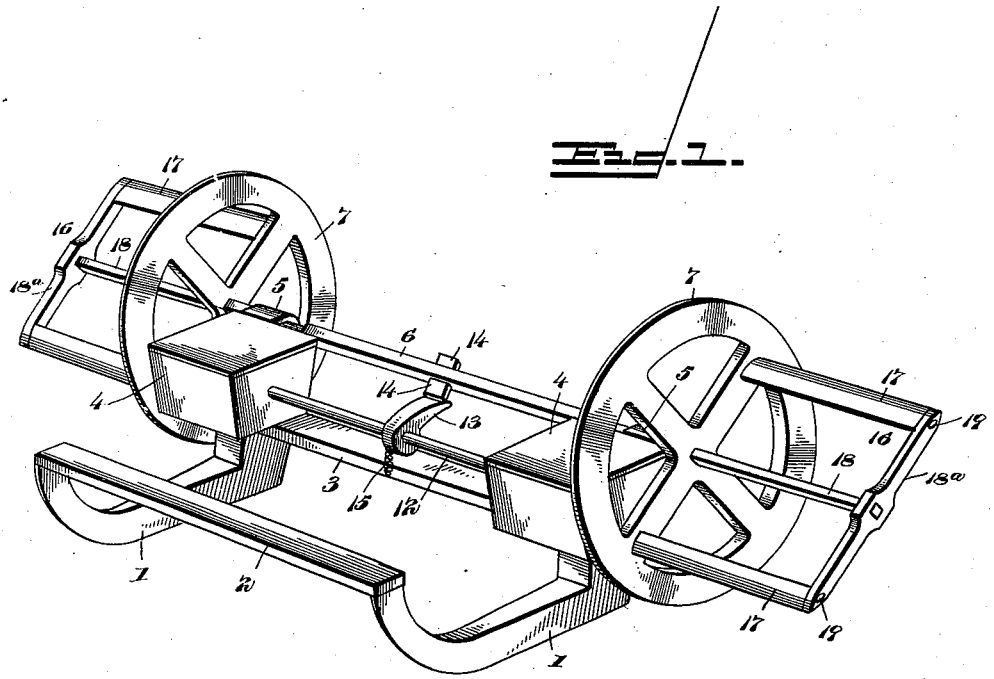
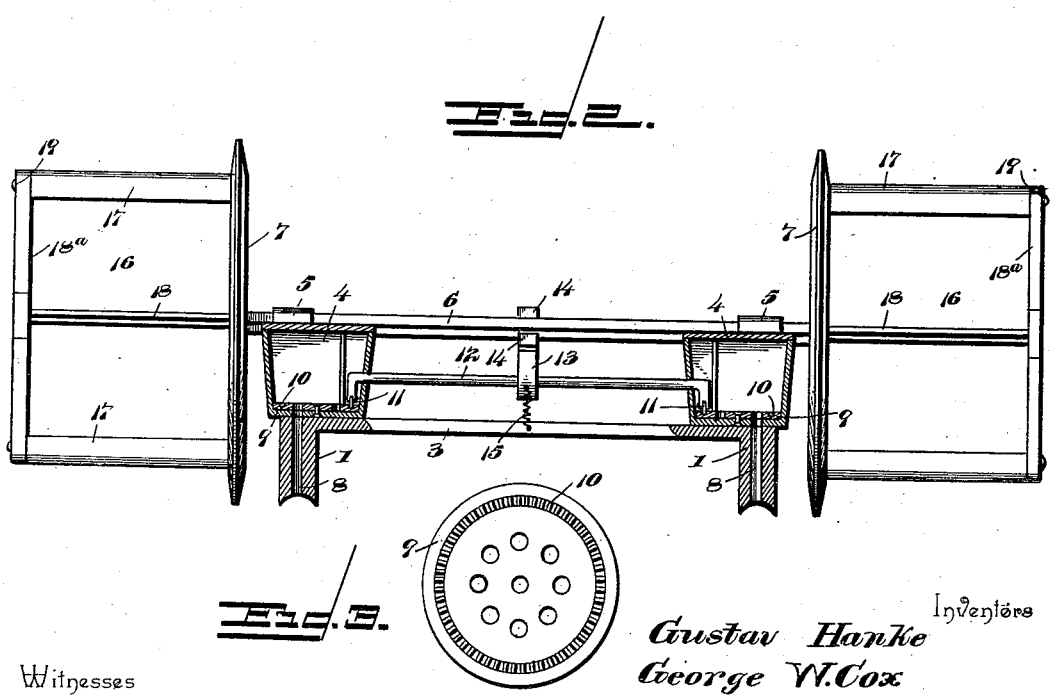
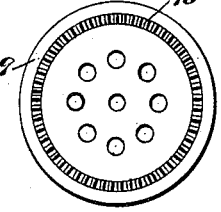
Witnesses
E. K. Stewart
Inventors
Gustav Hanke
George W. Cox
Jackson B. Wilson
By their Attorneys
C. A. Snow & Co.

UNITED STATES PATENT OFFICE.

GUSTAV HANKE, GEORGE W. COX, AND JACKSON B. WILSON, OF ADAIR, IOWA.

DROPPING AND MARKING ATTACHMENT FOR CORN-PLANTERS.

SPECIFICATION forming part of Letters Patent No. 560,581, dated May 19, 1896.

Application filed June 26, 1895. Serial No. 554,117. (No model.)

*To all whom it may concern:*

Be it known that we, GUSTAV HANKE, GEORGE W. COX, and JACKSON B. WILSON, citizens of the United States, residing at Adair, in the county of Adair and State of Iowa, have invented a new and useful Dropping and Marking Attachment for Corn-Planters, of which the following is a specification.

Our invention relates to an attachment for corn-planters, and has for its object to provide a simple and efficient device for operating the planting mechanism of a corn-planter and marking the hills, the operation of the seed-planting mechanism depending directly upon the rotation of the wheels which carry the markers.

Further objects and advantages of this invention will appear in the following description, and the novel features thereof will be particularly pointed out in the appended claims.

In the drawings, Figure 1 is a perspective view of a device constructed in accordance with our invention applied in the operative position to a corn-planter. Fig. 2 is a transverse section of the planter, showing the attachment in front view. Fig. 3 is a plan view of a seed-disk.

Similar numerals of reference indicate corresponding parts in all the figures of the drawings.

1 designates furrow-opening shoes, connected at their front ends by a cross-bar 2 and at their rear ends by a cross-beam 3, upon which are arranged the seed-boxes 4, all of the ordinary construction. Bearings 5 are carried by the seed-boxes for the reception of the spindle portions of the driving-shaft 6, said driving-shaft being extended beyond the bearings and carrying the operating or ground wheels 7. Any suitable mechanism may be employed for controlling the feeding of the seed to the chutes 8—such, for instance, as a disk 9, having the usual seed-perforations and provided with peripheral ratchet-teeth 10 for engagement by a pawl 11 on the extremity of a rock-shaft 12. The rock-shaft is provided with an arm 13, the free end of which is arranged in the path of projections 14 on the driving-shaft 6, said arm and rock-shaft being returned after each operation to the normal position by means of a retraction-spring 15. The peripheries of the operating or ground wheels 7 are reduced or tapered, and projecting outwardly from said wheels are the marking-frames 16, comprising marking-bars 17, arranged, respectively, upon opposite sides of the main shaft extensions 18 and connected at their outer extremities to said extensions by means of cross-heads $18^a$. Said cross-heads are provided with central rectangular openings, which fit upon the extremities of the shaft extensions, and at their ends with openings through which bolts or screws 19 extend to engage the outer ends of the marking-bars, the inner ends of the marking-bars being similarly secured to the operating or ground wheels. The marking-bars 17 are reduced toward their outer edges, as are the extremities of the cross-heads $18^a$, the outer edges of said bars being set back from the peripheries of the operating or ground wheels to provide for the depression of said wheels in the soil a distance sufficient to insure the uniform rotation of the wheels before the edges of the marking-bars come in contact with the surface of the soil.

The operating or ground wheels mark the soil parallel with the rows and therefore serve as a guide to the operator in successive rows, and the marking-bars, which extend laterally beyond the wheels a distance equal to the interval between contiguous rows of planting, mark the soil transversely and thus indicate the positions of the hills, one of the projections 14 being arranged in the plane of each pair of marking-bars on the wheels.

The attachment comprises the shaft, wheels, and markers, and it may be applied to a corn-planter of any ordinary construction.

Various changes in the form, proportion, and the minor details of construction may be resorted to without departing from the spirit or sacrificing any of the advantages of this invention.

Having described our invention, what we claim is—

1. An attachment for corn-planters having a shaft operatively connected with planting mechanism, operating or ground wheels secured to and adapted to impart motion to the main shaft, and marking-frames carried by said wheels and having parallel rigid marking-bars projecting outwardly from the wheels at diametrically-opposite points and provided with reduced outer edges, and diametrical cross-heads secured to and connecting the outer extremities of said marking-bars, the marking-bars extending laterally beyond the wheels a distance equal to the interval between contiguous rows of planting, substantially as specified.

2. An attachment for corn-planters having a shaft adapted to be operatively connected with planting mechanism, operating or main wheels secured to the shaft and provided with reduced peripheries to mark the soil parallel with the rows of planting, shaft extensions projecting laterally beyond the outer sides of the wheels, and marking-frames having diametrically-opposite marking-bars arranged parallel with the shaft extensions and projecting laterally a distance equal to the interval between contiguous rows of planting, and cross-heads secured at their centers to the extremities of the shaft extensions and at their ends to the marking-bars, said marking-bars being reduced at their outer edges to mark the soil transverse to the rows of planting, substantially as specified.

In testimony that we claim the foregoing as our own we have hereto affixed our signatures in the presence of two witnesses.

GUSTAV HANKE.
GEORGE W. COX.
JACKSON B. WILSON.

Witnesses:
W. H. CROOKS,
JAMES LEES.